UNITED STATES PATENT OFFICE.

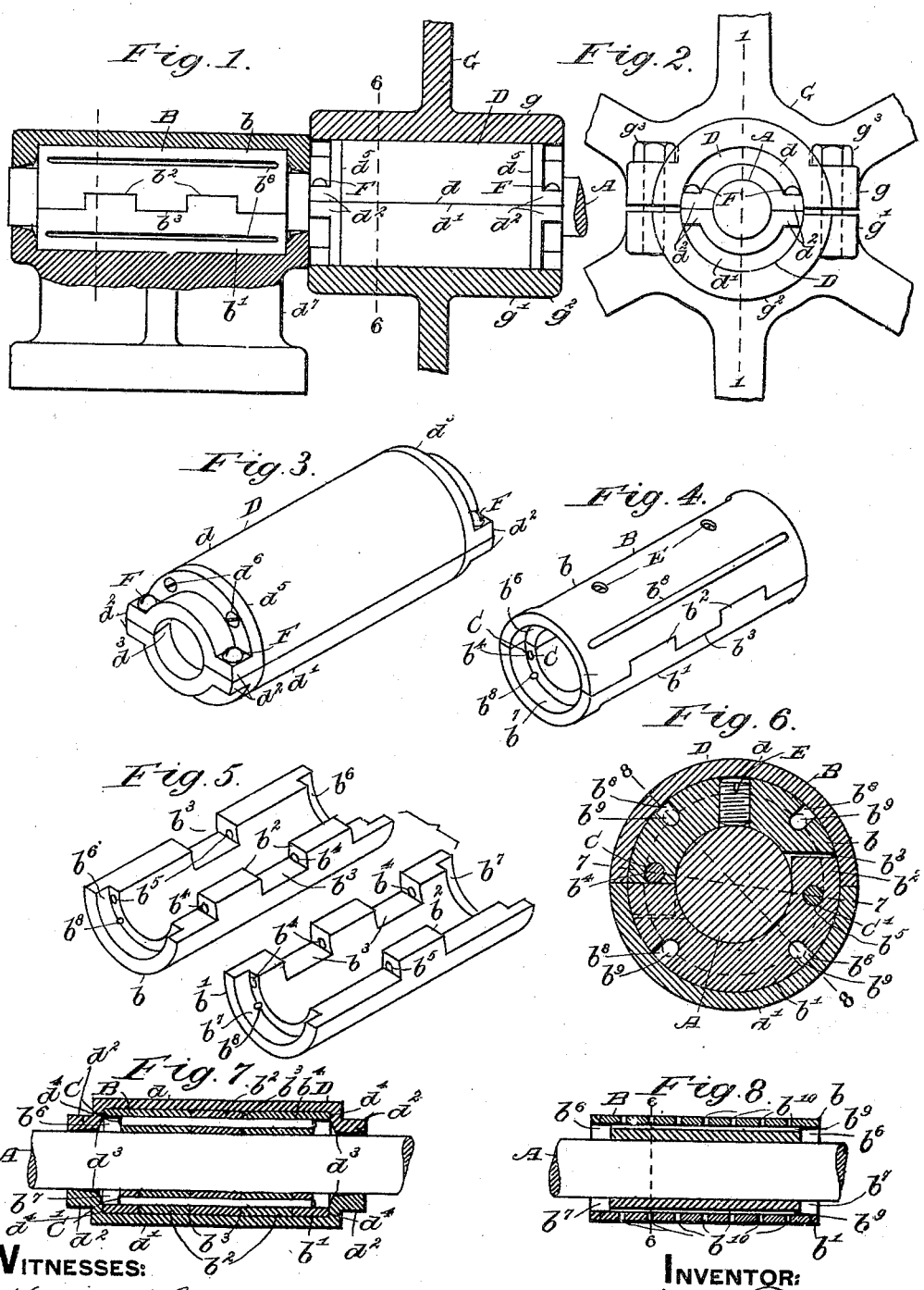

JOHN T. PHILLIPS, OF LOWELL, MASSACHUSETTS.

SELF-LUBRICATING BEARING.

SPECIFICATION forming part of Letters Patent No. 682,268, dated September 10, 1901.

Application filed June 25, 1900. Serial No. 21,424. (No model.)

*To all whom it may concern:*

Be it known that I, JOHN T. PHILLIPS, a citizen of the United States, and a resident of Lowell, in the county of Middlesex and State of Massachusetts, have invented certain new and useful Improvements in Self-Lubricating Bearings, of which the following is a specification.

This invention relates to self-lubricating bearings, and is applicable to journal-boxes for shafting and as a bushing for the hubs of loose pulleys.

The invention comprises an inner sleeve, adapted to be secured to the shaft in either case and to rotate only therewith, and an outer sleeve, in which said inner sleeve freely turns. Where the device is used as a journal-box, the outer sleeve is stationary; but where the device is used as a bushing for a loose pulley said outer sleeve turns with the pulley. For convenience of construction and use these sleeves are preferably made in separable halves and means are provided for securing the halves of each sleeve to each other. In the case of the inner sleeve provision is made to prevent the halves of the sleeve from being put together except in the proper manner—that is, to prevent one half from being turned end for end with respect to the other half of said inner sleeve. This device also provides a considerable space to serve as a reservoir for oil or other lubricating material, passages through which the lubricating material may circulate freely, means of preventing the lubricating material from running on the shaft beyond the end of the outer sleeve, and means for preventing an endwise movement of the outer sleeve on the inner sleeve, thus preventing the necessity for the use of stop-collars at the end of the device.

In the accompanying drawings, Figure 1 is a central vertical section of a journal-box and loose pulley, each provided with my invention, only the hub and parts of the arms of the loose pulley being shown and the lower part of the journal-box being represented in front elevation, the plane of section being on the line 1 1 in Fig. 2; Fig. 2, a side elevation of the hub and parts of the arms of a loose pulley provided with my invention; Fig. 3, an isometric perspective view of the outer sleeve of the device, showing the same provided with separable ends; Fig. 4, an isometric perspective view of the inner sleeve; Fig. 5, an isometric perspective view of the parts of the inner sleeve separated; Fig. 6, a vertical section of the shaft and bearing at right angles to the shaft and on the line 6 6 in Fig. 1; Fig. 7, a longitudinal central section of the bearing on the line 7 7 in Fig. 6; Fig. 8, a longitudinal central section of the inner sleeve on the line 8 8 in Fig. 6, the shaft being shown in side elevation in Figs. 7 and 8.

The shaft A is of the usual cylindrical form.

The inner sleeve B is divided centrally and longitudinally into halves or sections $b$ $b'$, each half or section being provided with tongues $b^2$, which enter corresponding recesses $b^3$ in the other half of the sleeve when the halves of the sleeve are put together, and to prevent the halves of the inner sleeve from being turned end for end with relation to each other after they have been properly fitted to each other and to the shaft on which they are to be placed each half is provided at one edge with tongues only and at the other edge with grooves only. Each half of the inner sleeve is provided at each side with a longitudinal hole $b^4$ $b^5$, which passes entirely through said half and through the tongue or tongues of the other half, these holes $b^4$ $b^5$ each receiving a rod C C' to bind the two halves together.

The ends of the inner sleeve B are counterbored at $b^6$ $b^7$, Figs. 4, 5, 7, and 8, or provided with concentric enlargements of the bore of said sleeve B to form with the inner walls of the ends of the outer sleeve annular oil-chambers, which surround the shaft, as hereinafter explained.

The sleeve B is retained in place on the shaft A and caused to rotate therewith by any usual means, as by a spline or by one or more set-screws E driven through said sleeve against the shaft in a well-known manner.

The oil-chambers $b^6$ $b^7$ or counterbores are connected by one or more longitudinal oil-passages, which for cheapness of construction are preferably milled grooves $b^8$, Figs. 1, 4, 5, and 6, formed on the outside of said sleeve and of a sufficient length and depth to enter said oil-chambers at the ends of said grooves, as shown. In Fig. 8 the oil-passages are represented as longitudinal holes $b^9$, connecting the chambers $b^6$ $b^7$ and other radial holes $b^{10}$, leading from the holes $b^9$ to the outer surface of the sleeve B. Regarding the small dotted circles in Fig. 6 as representing the holes $b^9$, Fig. 6 may be said to be a vertical cross-section on the line 6 6 in Fig. 8. Either construction of the oil-passages will cause the oil to be distributed on the outer surface of the sleeve B when the latter is rotated or when either of the sleeves B D is rotated on or in the other, the oil being wiped out of the oil-passages by the relative movement of the inner surface of the outer sleeve.

The outer sleeve D is preferably formed in halves $d\ d'$, which are secured to each other in any usual manner, as by screws or bolts F, which unite suitable ears $d^2$, formed on the ends of said sleeve D. The internal diameter of the sleeve D (except near its ends) is sufficient to receive the sleeve B and to allow said sleeves to turn freely with reference to each other.

The outer ends of the sleeve D have a smaller internal diameter than the external diameter of the sleeve B and bear against the ends of said inner sleeve and prevent any longitudinal movement of said sleeves relatively to each other, so that the inner sleeve, as already explained, being secured to the shaft A, no set-collars or stop-collars are necessary to prevent endwise movement of the outer sleeve D upon the shaft or of said shaft in said outer sleeve.

The internal diameter of the sleeve D at its extreme ends is very slightly larger than the external diameter of the shaft A and flares slightly inwardly at $d^3$ to the inner end walls $d^4$ of the hollow of said sleeve D, said walls $d^4$ forming the outer walls of the annular oil-chambers $b^6\ b^7$ and being preferably slightly inclined from the shaft toward the middle of the sleeve. This construction causes any oil thrown from the shaft within the sleeve to be carried by centrifugal force back into the oil-chambers $b^6\ b^7$ when the outer sleeve is revolving and causes the oil to run down back into said oil-chambers below the shaft when said outer sleeve is at rest and prevents the oil from "crawling" on the shaft out of said sleeve. Centrifugal force also carries the oil in said annular oil-chambers outward in such a manner as to force the oil into the oil-passages of the inner sleeve and to keep the contacting surfaces of the sleeves thoroughly lubricated. Surplus oil returns to the oil-chambers over the ends of the inner sleeve, and a constant circulation of oil is secured when either of the sleeves is in motion.

The outer sleeve may have for convenience of construction in small shops and to enable the outer sleeve to be more readily removed one or both ends detachable from the body of said sleeve, as represented in Fig. 3, where $d^5$ indicates the detachable ends secured to the body of the sleeve by screws $d^6$, which being removed allow the ends to be separated from the body of the sleeve D and permit said sleeve being drawn off from the sleeve B.

By providing the lower half of the outer sleeve D with a suitable foot or stand $d^7$ a journal-box is produced, as shown at the left in Fig. 1, and obviously by inverting this journal-box the part $d^7$ may be secured to an overhead support and serve as a hanger.

At the right of Fig. 1 and in Fig. 2 the outer sleeve D is represented as the bushing of a loose pulley G, said pulley being represented as a split pulley, the halves $g\ g'$ of the hub $g^2$ being clamped on said outer sleeve by screws $g^3$, which draw said halves together, said screws passing through ears on one half $g$ into the other half of said hub. Any other well-known means for securing an external hollow cylinder to an internal cylinder, as set-screws or splines, may obviously be used to secure the pulley G on the sleeve D.

It will be seen that unless the internal diameter at the outer ends of the outer sleeve D were less than the internal diameter of same between said ends there could be no oil-reservoir.

I claim as my invention—

1. The combination, in a self-lubricating bearing, of a shaft, a sleeve, surrounding said shaft and rigidly secured thereto, and provided in its ends with counterbores, and an outer sleeve, surrounding said inner sleeve and beyond the ends of said inner sleeve having a less internal diameter than said counterbores, to form with said counterbores annular oil-chambers.

2. The combination, in a self-lubricating bearing, of a shaft, a sleeve, surrounding said shaft and rigidly secured thereto, and provided in its ends with counterbores, and an outer sleeve, surrounding said inner sleeve and beyond the ends of said inner sleeve having a less internal diameter than said counterbores, to form with said counterbores annular oil-chambers, said inner sleeve having oil-passages which connect said oil-chambers with each other and with the outer curved surface of said inner sleeve.

3. The combination, in a self-lubricating bearing, of a shaft, a sleeve, surrounding said shaft and rigidly secured thereto, and provided in its ends with counterbores, and an outer sleeve surrounding said inner sleeve and beyond the ends of said inner sleeve having a less internal diameter than said counterbores, to form with said counterbores annular oil-chambers, and said inner sleeve having two longitudinal halves, each of said halves being provided at one of its meeting edges with one or more tongues or projections and at its other meeting edge with one or more grooves, the tongues and grooves respectively of each half being adapted to enter and to receive the grooves and tongues of the other half.

In witness whereof I have hereto subscribed my name this 18th day of June, 1900.

JOHN T. PHILLIPS.

Witnesses:
ALBERT M. MOORE,
FRANK BROWN.